United States Patent
Hall et al.

(10) Patent No.: US 10,538,962 B2
(45) Date of Patent: Jan. 21, 2020

(54) EASY INSTALLATION HEADRAIL ASSEMBLY

(71) Applicants: David R. Hall, Provo, UT (US); Austin Carlson, Provo, UT (US); Emily Brimhall, Alpine, UT (US); Mark Madsen, Provo, UT (US)

(72) Inventors: David R. Hall, Provo, UT (US); Austin Carlson, Provo, UT (US); Emily Brimhall, Alpine, UT (US); Mark Madsen, Provo, UT (US)

(73) Assignee: Hall Labs LLC, Provo, UT (US)

(*) Notice: Subject to any disclaimer, the term of this patent is extended or adjusted under 35 U.S.C. 154(b) by 609 days.

(21) Appl. No.: 15/184,017

(22) Filed: Jun. 16, 2016

(65) Prior Publication Data
US 2017/0362889 A1    Dec. 21, 2017

(51) Int. Cl.
| | |
|---|---|
| *E06B 9/323* | (2006.01) |
| *E06B 9/42* | (2006.01) |
| *A47H 1/022* | (2006.01) |
| *F16B 2/18* | (2006.01) |
| *F16B 2/04* | (2006.01) |
| *F16B 1/00* | (2006.01) |
| *F16B 47/00* | (2006.01) |
| *A47H 2/02* | (2006.01) |
| *A47H 1/102* | (2006.01) |
| *F16M 13/02* | (2006.01) |
| *E06B 9/40* | (2006.01) |
| *E06B 9/44* | (2006.01) |

(52) U.S. Cl.
CPC .............. *E06B 9/323* (2013.01); *F16B 1/00* (2013.01); *F16B 2/04* (2013.01); *F16B 2/185* (2013.01); *F16B 47/003* (2013.01); *F16B 2001/0035* (2013.01)

(58) Field of Classification Search
CPC ........ E06B 9/44; E06B 2009/407; E06B 9/42; E06B 9/323; A47H 1/022; A47H 2/02; F16M 13/02; F16M 2200/027; F16B 2/04; F16B 2/185
USPC .................. 248/200.1, 343, 206.5, 251, 264
See application file for complete search history.

(56) References Cited

U.S. PATENT DOCUMENTS

| | | | | |
|---|---|---|---|---|
| 1,238,642 | A * | 8/1917 | Crump ..................... | E06B 9/44 116/43 |
| 1,752,472 | A * | 4/1930 | Whitney ................. | A47H 1/022 211/123 |
| 1,968,807 | A * | 8/1934 | Bowers .................. | A47H 1/022 211/105.6 |
| 2,207,517 | A * | 7/1940 | La Ganke ............... | E06B 9/323 160/902 |
| 2,435,373 | A * | 2/1948 | Van Buren .............. | E06B 9/323 160/167 R |

(Continued)

*Primary Examiner* — Jonathan Liu
*Assistant Examiner* — Taylor L Morris

(57) ABSTRACT

An apparatus for installing a window covering is disclosed. A rotational cam member is provided for extending a first piston on one side of a headrail and compressing a second piston on the opposite side of the headrail between a window casing. A lever arm is provided for rotating the rotational cam. Easy installation of a window covering headrail may be achieved as one arm is used to hold the headrail while the other hand is able to actuated the lever arm. Mounting brackets are provided for easy window covering removal after installation.

16 Claims, 10 Drawing Sheets

(56) References Cited

U.S. PATENT DOCUMENTS

| | | | | |
|---|---|---|---|---|
| 3,138,195 A * | 6/1964 | Cox | E06B 9/42 | 160/39 |
| 3,169,006 A * | 2/1965 | Lorentzen | E06B 9/323 | 248/262 |
| 3,203,468 A * | 8/1965 | Gossling | E06B 9/44 | 160/250 |
| 3,333,808 A * | 8/1967 | Du Boff | E04G 25/04 | 211/86.01 |
| 3,362,461 A * | 1/1968 | Stark | E06B 9/44 | 160/323.1 |
| 3,372,728 A * | 3/1968 | Schaefer | A47H 2/02 | 160/39 |
| 4,157,108 A * | 6/1979 | Donofrio | E06B 9/44 | 160/263 |
| 4,211,382 A * | 7/1980 | Bonfils | A47G 1/168 | 248/467 |
| 4,463,923 A * | 8/1984 | Reiker | E04B 9/006 | 248/27.1 |
| 4,592,180 A * | 6/1986 | Gerritsen | E06B 3/28 | 49/478.1 |
| 4,744,471 A * | 5/1988 | Leister | E04H 4/10 | 160/330 |
| 4,782,882 A * | 11/1988 | Amedeo | E06B 9/323 | 160/178.1 R |
| 4,809,401 A * | 3/1989 | Honig | A47H 1/022 | 16/87.2 |
| 4,848,432 A * | 7/1989 | Connolly | E06B 9/174 | 160/178.1 R |
| 5,024,412 A * | 6/1991 | Hung | H02G 3/20 | 220/3.9 |
| 5,044,582 A * | 9/1991 | Walters | H02G 3/126 | 248/200.1 |
| 5,769,293 A * | 6/1998 | Zaretsky | B60R 7/02 | 224/539 |
| 5,845,886 A * | 12/1998 | McCormick | F04D 25/088 | 248/200.1 |
| 6,192,962 B1 * | 2/2001 | Glover | A47H 2/02 | 160/126 |
| 6,460,593 B1 * | 10/2002 | Floyd | B60J 1/205 | 160/250 |
| 6,470,948 B2 * | 10/2002 | Yates | E06B 9/0692 | 160/35 |
| 6,648,046 B1 * | 11/2003 | Gibson | E06B 9/323 | 160/178.1 R |
| 6,694,543 B2 * | 2/2004 | Moore | A47H 1/022 | 248/261 |
| 7,128,124 B2 * | 10/2006 | Bibby | E06B 9/44 | 160/263 |
| 7,490,813 B1 * | 2/2009 | Weddle | A62B 3/005 | 248/354.1 |
| 7,516,771 B2 * | 4/2009 | Drew | E06B 9/323 | 160/173 R |
| 7,549,615 B2 * | 6/2009 | Shevick | E06B 9/266 | 160/168.1 R |
| 7,621,313 B2 * | 11/2009 | Pham | E06B 9/40 | 160/23.1 |
| 7,665,505 B2 * | 2/2010 | McCormick | E06B 9/44 | 160/238 |
| 7,836,604 B2 * | 11/2010 | Paharik | A47G 1/205 | 33/613 |
| 7,918,428 B2 * | 4/2011 | Kim | F16M 11/048 | 248/295.11 |
| 7,934,330 B2 * | 5/2011 | Nicolaisen | A47G 1/17 | 248/205.3 |
| 8,261,509 B2 * | 9/2012 | Harkin | E04G 23/0237 | 52/645 |
| 8,371,355 B2 * | 2/2013 | Santoro | E06B 9/42 | 160/268.1 |
| 8,434,730 B2 * | 5/2013 | Ahlstrom | A47G 1/168 | 248/206.5 |
| 8,544,661 B1 * | 10/2013 | Melino, Sr. | A47H 1/102 | 211/105.6 |
| 9,670,722 B1 * | 6/2017 | Hall | E06B 9/323 | |
| 10,008,842 B1 * | 6/2018 | Baldwin | H02G 3/125 | |
| 2006/0162876 A1 * | 7/2006 | Kwak | E06B 9/42 | 160/296 |
| 2009/0250575 A1 * | 10/2009 | Fullerton | G09F 7/04 | 248/206.5 |
| 2010/0258701 A1 * | 10/2010 | Foreman | B62K 19/36 | 248/408 |
| 2011/0087249 A1 * | 4/2011 | Rodrigues | A61B 17/0401 | 606/151 |
| 2014/0238717 A1 * | 8/2014 | Korcz | F16M 13/027 | 174/50 |
| 2015/0020984 A1 * | 1/2015 | Fennell | E06B 9/50 | 160/323.1 |
| 2015/0060616 A1 * | 3/2015 | Jaramillo | A47B 81/061 | 248/200.1 |
| 2017/0044826 A1 * | 2/2017 | Nakae | E06B 9/42 | |
| 2018/0238107 A1 * | 8/2018 | Hall | E06B 9/323 | |
| 2018/0252033 A1 * | 9/2018 | Bohlen | A47H 27/00 | |
| 2018/0328105 A1 * | 11/2018 | Hall | F16B 2/04 | |

\* cited by examiner

EASY INSTALLATION HEADRAIL ASSEMBLY

BACKGROUND

Field of the Invention

This invention relates to systems and methods for installing window coverings and other window coverings.

Background of the Invention

Window coverings and other similar window coverings are typically installed in windows using mounting brackets that are screwed into the upper corners of window casings. Although effective, this installation technique may require a user to make measurements to ensure that the brackets are installed in the correct locations, as well as require tools (e.g., drills, screwdrivers, etc.) to drive the screws into the window casing. Unfortunately, this installation technique may also leave unsightly holes in the window casing and potentially damage the paint or finish thereon. This installation technique can also be quite time consuming. In a home or building containing many windows to be outfitted with window coverings or other window coverings, the installation time may increase accordingly.

In order to reduce the amount of time and/or effort needed to install window coverings, installation techniques have been developed. One such technique involves placing spring-loaded mounting brackets at the end of a window covering headrail. When the window covering headrail is placed into a window casing, the spring-loaded mounting brackets are released to provide a compression fit between the window covering and the window casing. Unfortunately, in some cases, such springs may generate insufficient force to secure the window covering to the window casing, particularly with long or heavy window coverings. This can result in movement or creep of the window covering relative to the window casing allowing the window covering to become dislodged or even fall.

In view of the foregoing, what is needed are improved systems and methods to securely install window coverings in window casings. Ideally, such systems and methods will eliminate and/or reduce the need for tools when installing window coverings. Such systems and methods will also ideally eliminate and/or reduce the need for screws or other fasteners when installing window coverings.

SUMMARY

This invention has been developed in response to the present state of the art and, in particular, in response to the problems and needs in the art that have not yet been fully solved by currently available systems and methods. Accordingly, improved systems and methods have been developed to install window coverings. Features and advantages of different embodiments of the invention will become more fully apparent from the following description and appended claims, or may be learned by practice of the invention as set forth hereinafter.

Consistent with the foregoing, a first end cap assembly for attachment to a first end of a headrail of a window covering, and a second end cap assembly for attachment to a second end of the headrail are disclosed. A rotational cam is provided within the first end cap assembly to extend a first piston of the first end cap assembly and compress a second piston of the second end cap assembly. When the cam is rotated, a compression fit between a window casing and a headrail is created as pressure from a first piston of the first end cap assembly pushes against one side of a window casing while the second piston on the opposite side of the headrail is compressing because of the pressure against the other side of the window casing. As the cam is rotated a window covering headrail is installed. The rotational cam may be rotated by a lever arm attached to the cam. The first end cap assembly and the second end cap assembly may interface with mounting brackets by magnetic force. One or more magnets may be attached to the pistons of the first and second end cap assemblies. The mounting bracket may have one or more spikes, barbs, or cleats protruding in different directions on each mounting bracket. The mounting bracket may be made of ferrous material. Spacers may be used in connection with the first and second end cap assemblies to lengthen a headrail to allow proper installation of a headrail in a window casing. The pistons of the first and second end cap assemblies may include marks or indicia for detecting a properly sized and installed window covering.

An apparatus for installing a window covering is disclosed. A rotational cam member is provided for extending a first piston on one side of a headrail and compressing a second piston on the opposite side of the headrail between a window casing. A lever arm is provided for rotating the rotational cam. Easy installation of a window covering headrail may be achieved as one arm is used to hold the headrail while the other hand is able to actuated the lever arm. Mounting brackets are provided for easy window covering removal after installation.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1A:
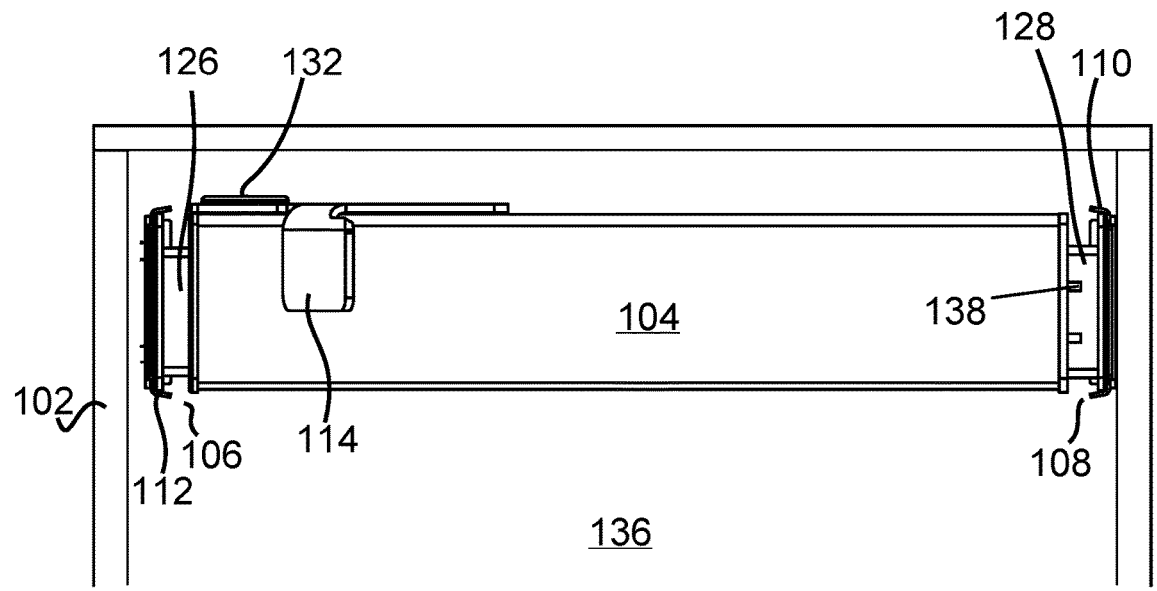
FIG. 1A is a front view of one embodiment of a window covering headrail uninstalled with a lever arm in an uninstalled position.
Figure 1B:
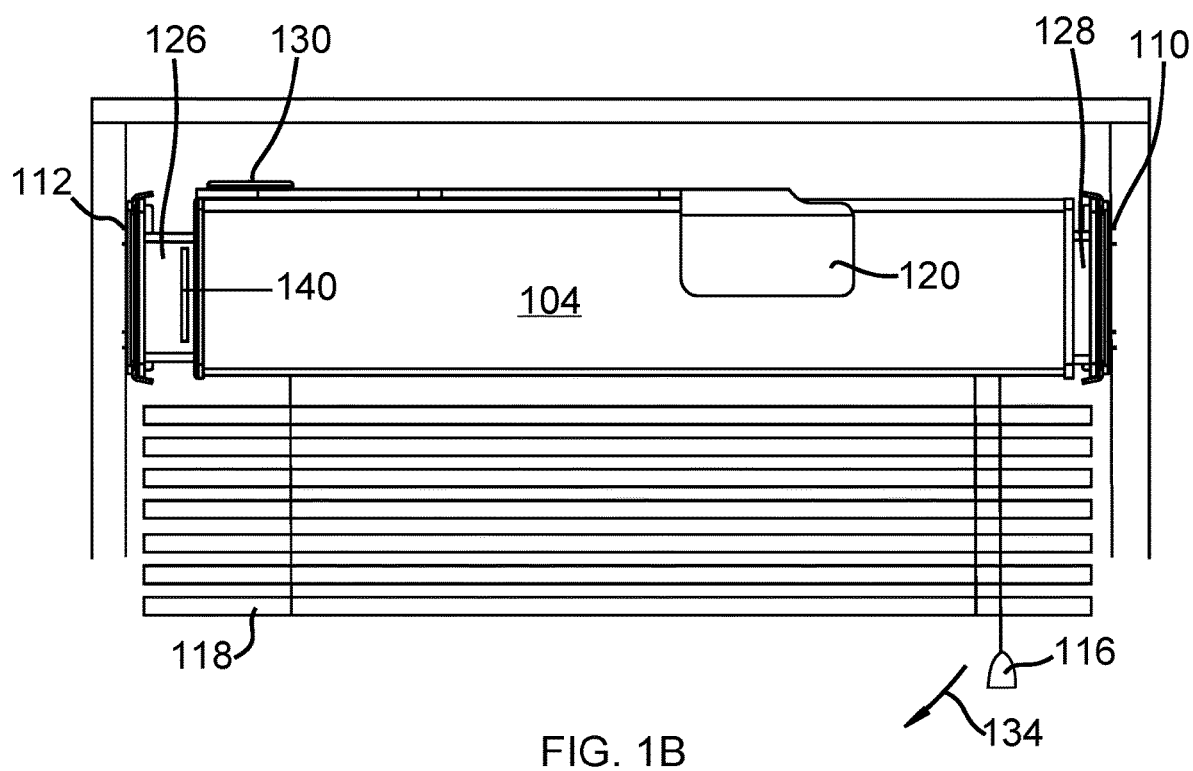
FIG. 1B is a front view of one embodiment of a window covering headrail installed with a lever arm in an installed position.

Referring to FIG. 1A, a front view of an uninstalled headrail 104 with a first end cap assembly 106 and a second end cap assembly 108. The first end cap 106 assembly is coupled to a first end of head rail 104 and the second end cap assembly 108 is coupled to a second end of headrail 104. The second end cap assembly 108 and the first end cap assembly 106 are configured to retain the window covering headrail 104 within a window casing 102 by creating a compression fit between the headrail 104 and the window casing 102. The first end cap assembly 106 is configured to extend a first piston 126 relative to the second end cap assembly 108 of the headrail 104 in order to create a compression fit against the inside of the window casing 102. Lever arm 114 may be connected to a rotational cam member 132 with in the first end cap assembly. Lever arm 114 is shown in an open position or uninstalled position. When lever arm 114 is in an open position, the second end cap assembly 108 is not compressed and the first end cap assembly is not extended. The first and second end cap assemblies may include a mark or indicia 138 and/or 140 which informs an installer about an installed condition of the head rail. In FIG. 1A, installation marks 138 are visible indicating that headrail 104 is not properly installed and that the second piston 128 is not compressed. Additionally, the line on end cap assembly 106 is not visible indicating that headrail is not installed properly and that the first piston 126 is not fully extended. Marks 138 may be red in color indicating a not installed or poorly installed condition. The marks 138 may indicate a number of spacers needed to lengthen the headrail 104 for proper installation. The hidden line on end cap assembly 106 may be green in color and may be visible when the headrail is installed properly as shown in FIG. 1B at 140. When headrail 104 is initially installed, mounting brackets 112 and 110 may be held to pistons 126 and 128 by magnetic force. One or more magnets may be embedded within a face of the pistons to hold the mounting brackets in place while the headrail is installed. This allows a person to hold the headrail in one hand and move lever 114 with the other hand to easily install headrail 104. In FIG. 1B, headrail 104 is in an installed position with lever arm 120 being in a position which is substantially parallel with the headrail 104. The installation marks 138 are not visible indicating that the head rail is installed properly. If installation marks 138 are visible after a headrail installation this may indicate an improperly sized headrail. The installation marks 138 may be red in color indicating a problem. After the headrail is installed, mounting brackets 112 and 110 may become attached to the window casing allowing headrail 104 to slide in a forward direction out of the mounting brackets when the installation lever is in position 114 shown in FIG. 1A. The present invention provides a secure headrail that will not fall when force is applied to drawstring 116 in a direction 134 as the blinds are lifted or lowered. The first end cap assembly 106 forms a solid connection with the window casing 102 when lever 120 is substantially parallel to headrail 104. The compression only take place in the second end cap assembly 108 which is on the other side of the drawstring 116. The installation marks 138 may also indicate a size or number of headrail spacers needed to extend the headrail. In the event of a headrail being too small, spacers 218 may be placed between the first end cap assembly or the second end cap assembly and the headrail 220 as shown in FIG. 2 at spacer cross-section 218.

Figure 2:
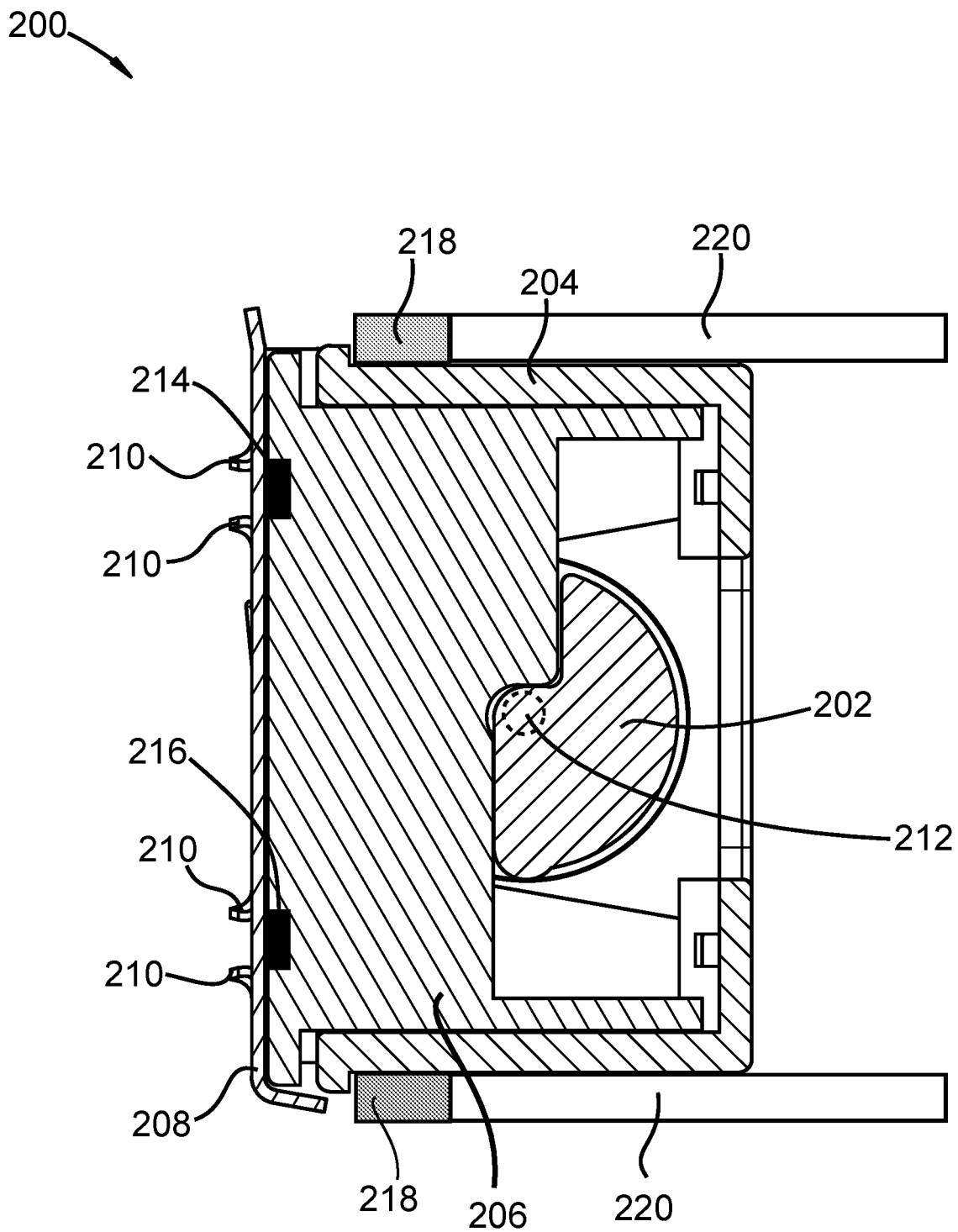
FIG. 2 is a cross-sectional view of an end cap assembly with a rotational cam in accordance with an embodiment of the invention.

In FIG. 2, a cross-section of a first end cap assembly (with cross-hatching) is shown with spacer 218 between the end cap assembly and the headrail 220. One or more spacers may be used to achieve a desired headrail length. As shown, the first end cap assembly contains an outer member 204, a first piston 206, a cam member 202, and a mounting bracket 208. The piston 206 moves or extends outward as cam 212 is rotated. As cam member 202 is rotated around an axis of rotation 212, cam member 202 pushes piston member 206 away from outer member 204 resulting in an extension of piston 206. Outer member 204 may, in certain embodiments, slide into an end of the headrail 220. In other embodiments, outer member 204 slides over the end of the headrail 220, such as in cases where the end of the headrail 220 is closed. The end cap assembly may be sized to fit snugly within the headrail 220. The end cap assembly may also be provided in different sizes to accommodate headrails 220 of different dimensions. In other embodiments, the end cap assembly may include different adapters to fit different sizes of headrails 220, thereby allowing a uniform-size end cap assembly to be installed in different size headrails 220. A spacer 218 may be used to lengthen a headrail when a headrail and window casing are not properly matched. One or more magnets 214 and 216 may be embedded into piston 204 or be near a front surface of piston 204. The magnets 214 and 216 may be used to attract and hold, by magnetic force, mounting bracket 208 while the headrail is installed. Mounting bracket 210 may include protrusions for entering a surface of a window casing. The protrusions may be spikes 210, barbs 210, or cleats 210. The protrusions may be grouped in groups of four 310 as shown in FIG. 3.

Figure 3:
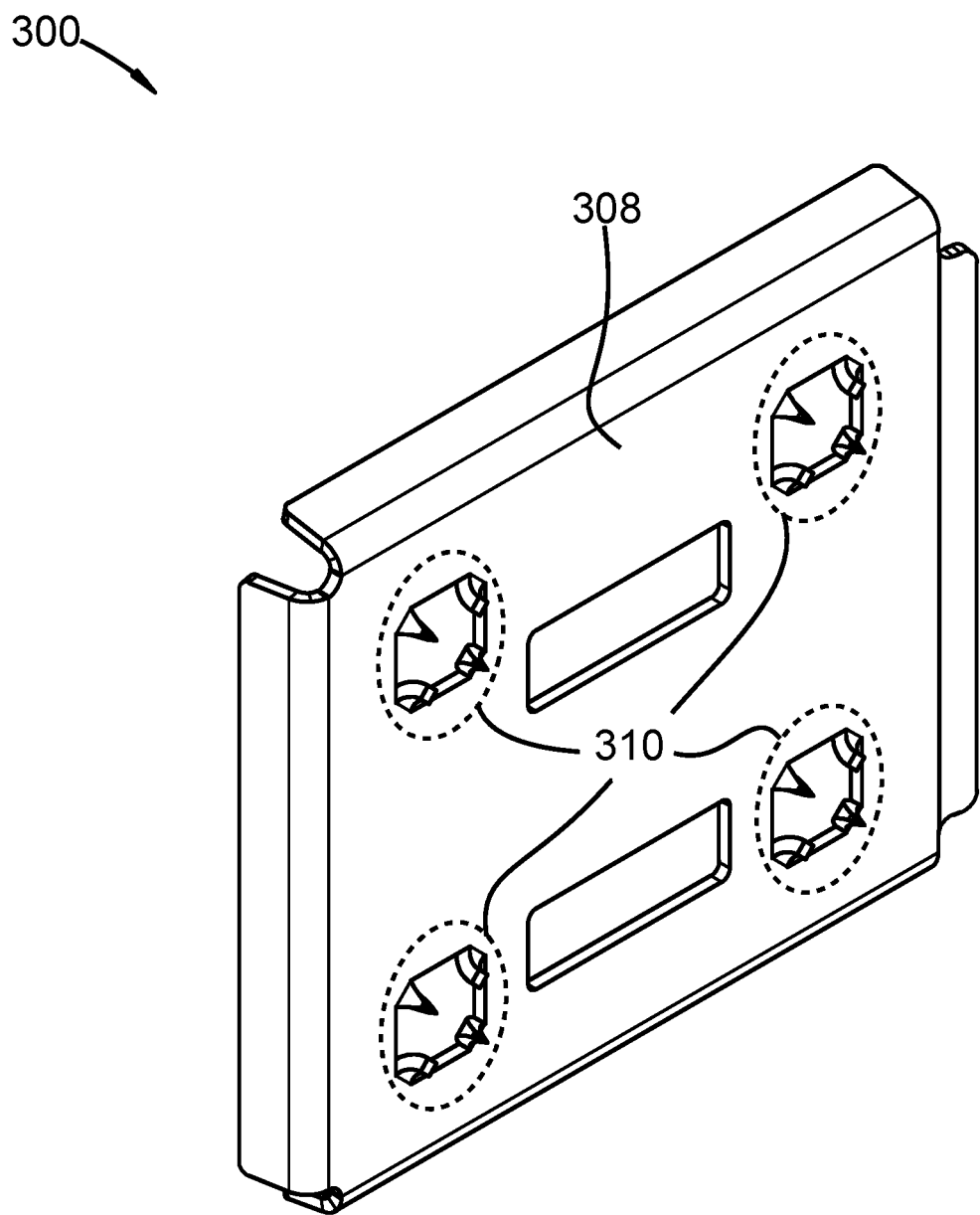
FIG. 3 is a perspective view showing a mounting bracket in accordance with an embodiment of the invention.

FIG. 3 shows a mounting bracket 308 which attaches to both the first and the second end cap assemblies. The bracket 308 may have three sides which are formed by bending 90 degrees allowing the headrail to slide in on the non-bend side. Mounting bracket 308 may include protrusions 310 for entering a surface of a window casing. The protrusions may be spikes 310, barbs 310, or cleats 310. The protrusions may be grouped in groups of four 310 as shown. The protrusions within each group may be oriented in different positions relative to each other.

Figure 4:
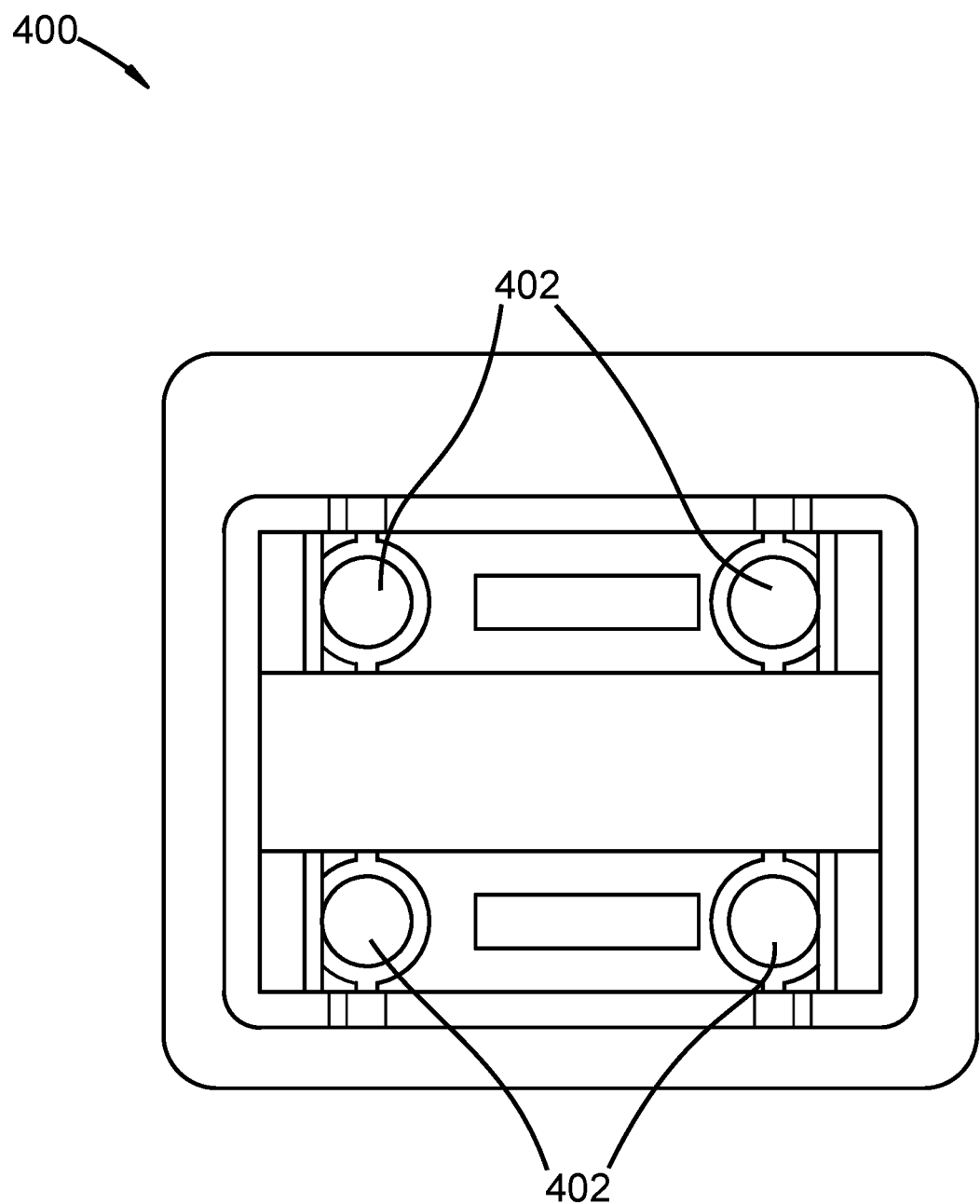
FIG. 4 is a front view of magnets within an end cap assembly in accordance with an embodiment of the invention.

FIG. 4 shows a view of magnets 402 positioned within a first or second end cap assembly 400. The magnets 402 may be planer, recessed, or embedded within a front face of a first and second end cap assemblies. The magnets 402 on each first and second end cap may be used to hold a first and second mounting bracket 300 as shown in FIG. 3 while a headrail is installed.

Figure 5:
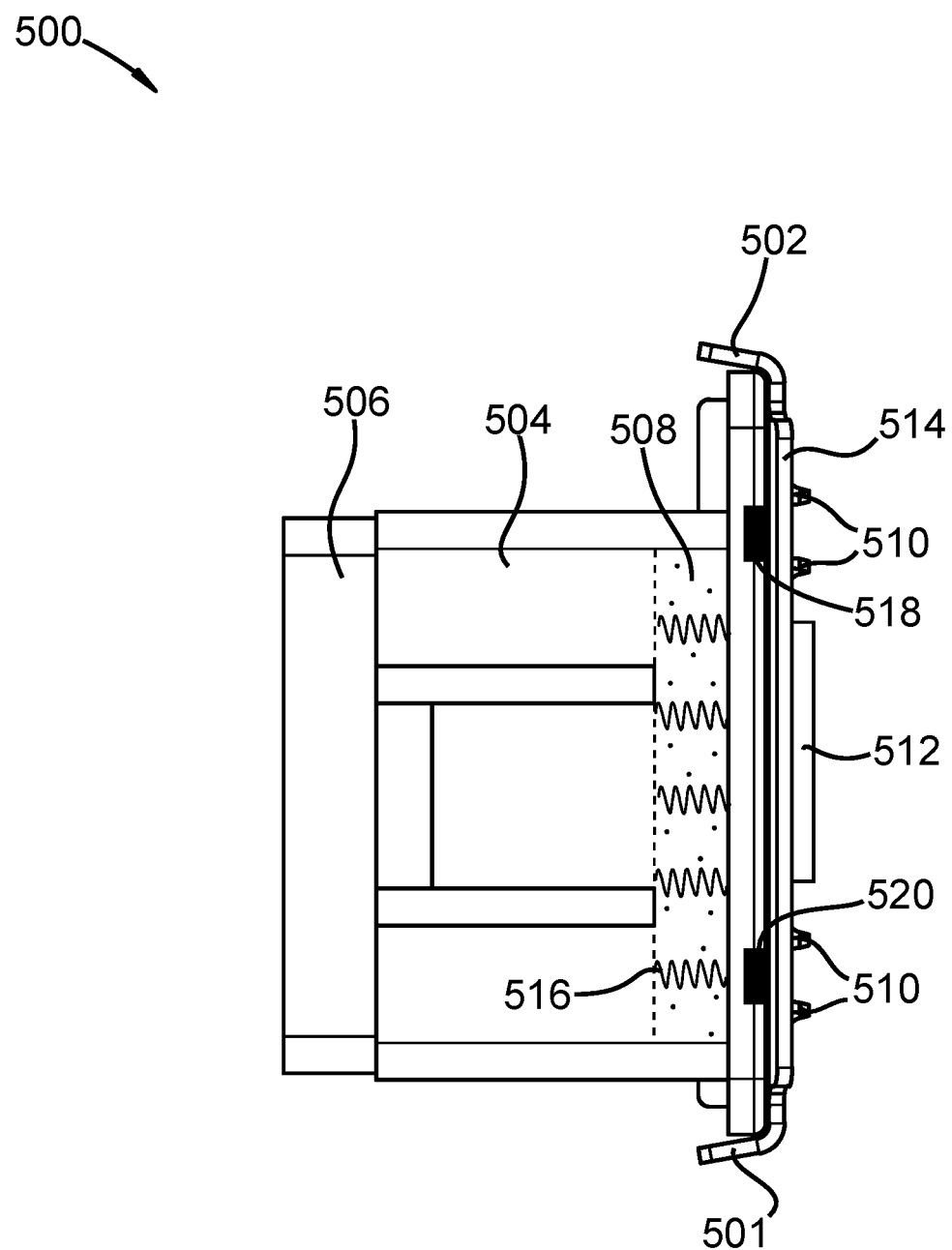
FIG. 5 shows a cross-sectional view of an end cap assembly with one or more compressible members in accordance with an embodiment of the invention.

As shown in FIG. 5, a second end cap assembly 500 has a mounting bracket 502 installed with protrusions 510 for entering a surface of a window casing. The protrusions may be spikes 510, barbs 510, or cleats 510. Mounting bracket 502 is attached to the second end cap assembly 500 by a magnetic force of magnets 518 and 520. Mounting bracket 502 allows a window covering headrail to be removed and reinstalled after its initial installation. A corresponding mounting bracket 208 of FIG. 2 may be provided on a first end cap assembly 206 on an opposite side of the window covering headrail 104. The mounting bracket 502 may, in certain embodiments, be coated with an adhesive 512. When installing a window covering headrail 104 in a window casing 102, the mounting bracket 502 may be adhered to the window casing at a desired location. A lever arm rotational member 800, of FIG. 8, may then be rotated to create a compression fit between the window covering headrail 104 and the window casing 102. This will press the adhesive 512 against the window casing 102 to improve the bond therebetween. The adhesive 512 in combination with the spikes 510, barbs 510, or cleats 510 may improve the bond with the window casing 102. Once the mounting bracket 502 is attached to the window casing 102, the window covering headrail with the first and second end cap assemblies may be removed from the window casing by simply sliding the headrail out of the mounting brackets 502 when the cam is in a rotationally uninstalled position. The mounting brackets 502 may stay in place on the window casing 102. Another example of a mounting bracket for use with a window covering headrail is shown in FIG. 10. The window covering headrail may be reinstalled by simply sliding the window covering back into the mounting brackets 502 and rotating the cam into an installed rotational position. The second end cap assembly 500 is made to compress under pressure. Compression members 508 and/or 516 may compress under pressure allowing a second piston 506 to move relative to outer portion 504. One or more compressible members 508 and 516 may be selected from one or more of springs, foam, compliant springs, pistons, or compressible material. Compress happens when the rotational cam (in the first end cap assembly in FIGS. 7 and 9) is rotated to an installed position forcing the first piston in the first end cap assembly to push against a first inside surface of a window casing and causing the second piston in the second end cap assembly to compress against a second inside surface of a window casing.

Figure 6:
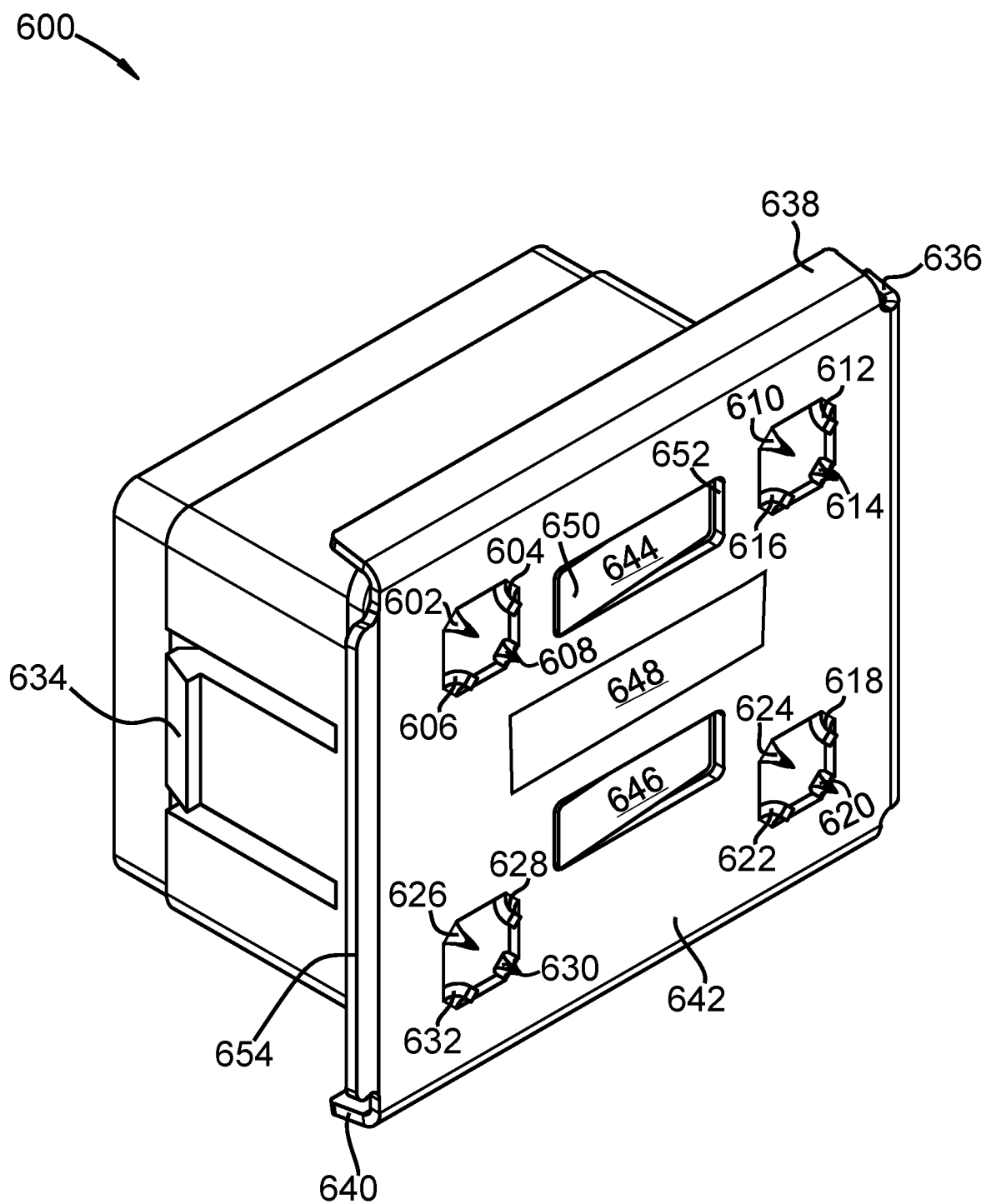
FIG. 6 shows a perspective view of an end cap assembly in accordance with an embodiment of the invention.

In FIG. 6, the mounting bracket 642 may be coated with an adhesive 648 to adhere the mounting bracket 642 to a window casing 102. The mounting bracket 642 is also configured with one or more spikes, barbs, or cleats 602-623, to penetrate the window casing 102 and prevent slippage between the window casing 102 and the window covering headrail. Recesses 652 may engage a protruding portion 650 of slide locks 644 and 646. The slide locks provide a way to keep the headrail of FIG. 1B from slipping forward within mounting brackets 642 when the headrail is in an installed state 120, of FIG. 1B. When the headrail is in an uninstalled state 114, of FIG. 1A, slide locks 644 and 646 disengage the mounting bracket at 650 allowing the headrail to slide out of the mounting brackets 642. Mounting bracket 642 may include three angled sides 638, 636, and 640 which allow the mounting bracket 642 to slide in and out of a window casing. An end cap compliant member 634 may provide necessary resistance to secure a first or second end cap to a headrail of a window covering.

Figure 7:
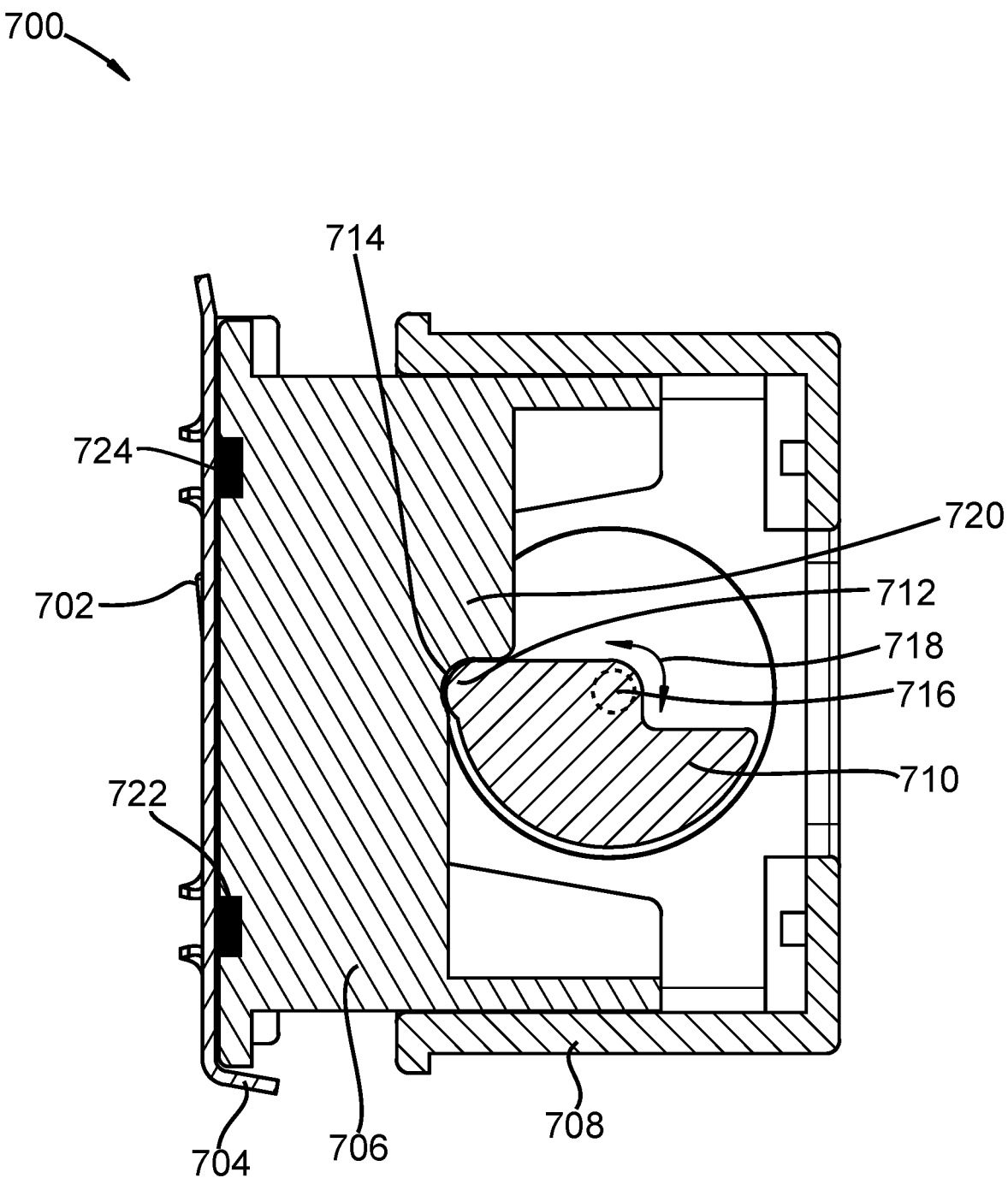
FIG. 7 shows a cross-sectional view of an end cap assembly in accordance with an embodiment of the invention.

In FIG. 7, a cross-section of a first end cap assembly is shown in an installed rotational position 718. Rotational cam 710 has a bump 712 which is received into groove 714. A lever arm 800 may be attached to an axis of rotation 716. The second end cap assembly 700 contains an outer member 708, a first piston 706, a cam member 710, and a mounting bracket 704. As cam member 706 is rotated around an axis of rotation 716, cam member 710 pushes first piston 706 away from outer member 708 resulting in an extending of piston 706 and locking bump 712 into groove 714. Piston 706 may, in certain embodiments, slide into a first end of a headrail. The end cap assembly may be sized to fit snugly within a headrail. As cam 710 is rotated 718 around axis of rotation 716, piston 706 is extended away from the cam 710. One or more magnets 724 and 722 may be embedded into piston 706 or be near a front surface of piston 706. The magnets 724 and 722 may be used to attract and hold, by magnetic force, mounting bracket 704 while the headrail is installed. Mounting bracket 704 may include protrusions for entering a surface of a window casing. The mounting bracket may be made of a ferrous material such as iron or an alloy containing iron.

Figure 8:
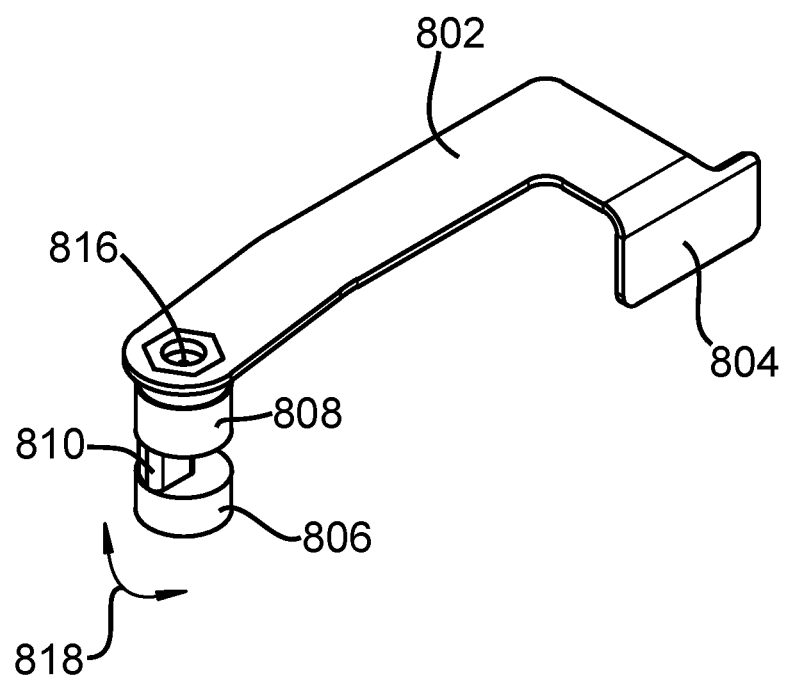
FIG. 8 shows a cam and lever arm of an end cap assembly in accordance with an embodiment of the invention.

In FIG. 8, a lever arm is shown connected to a rotational cam member. The rotational cam member may comprise circular bearing portions 808 and 806 on each side of a middle cam section 810. Middle cam section 810 may have a bump for locking the lever arm in an installed position substantially parallel to a headrail of a window covering. The lever arm may comprise a face portion 804 and an arm portion 802. The face portion 804 may be connected to arm portion 802 forming a 90-degree angle. As the lever arm is rotated, a first end cap assembly attached to a first end of a headrail of a window covering extends while a second end cap assembly attached to a second end of the headrail of a window covering compresses to create a compression fit between the headrail and the window covering.

Figure 9:
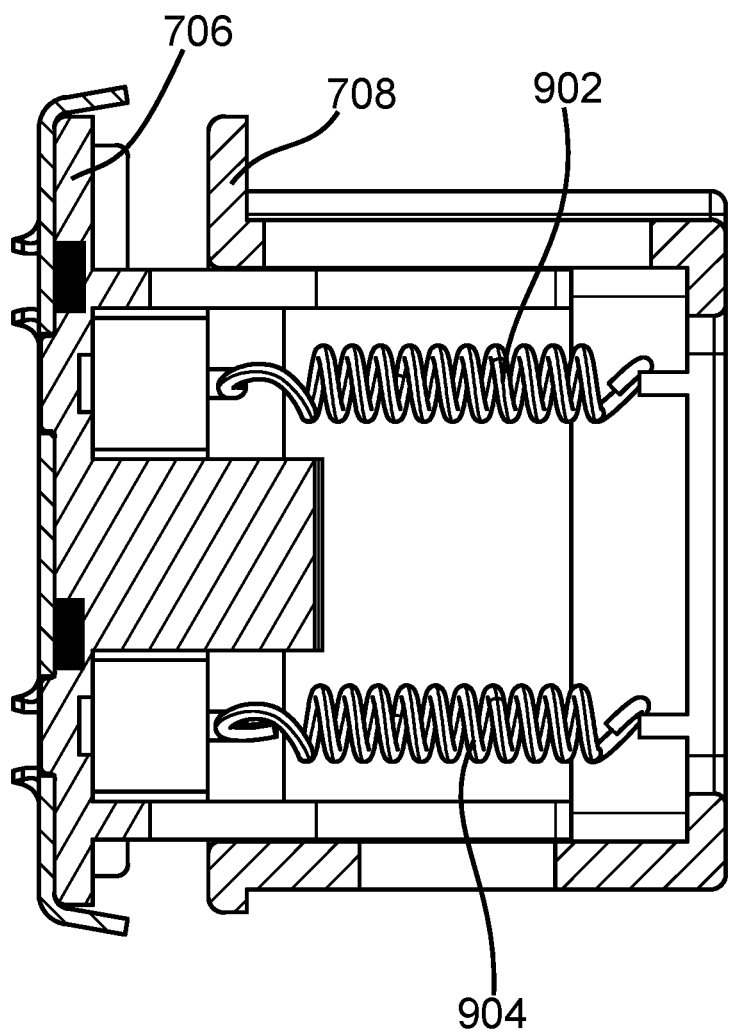
FIG. 9 shows a cross-sectional view of an end cap assembly in accordance with an embodiment of the invention.
Figure 10:
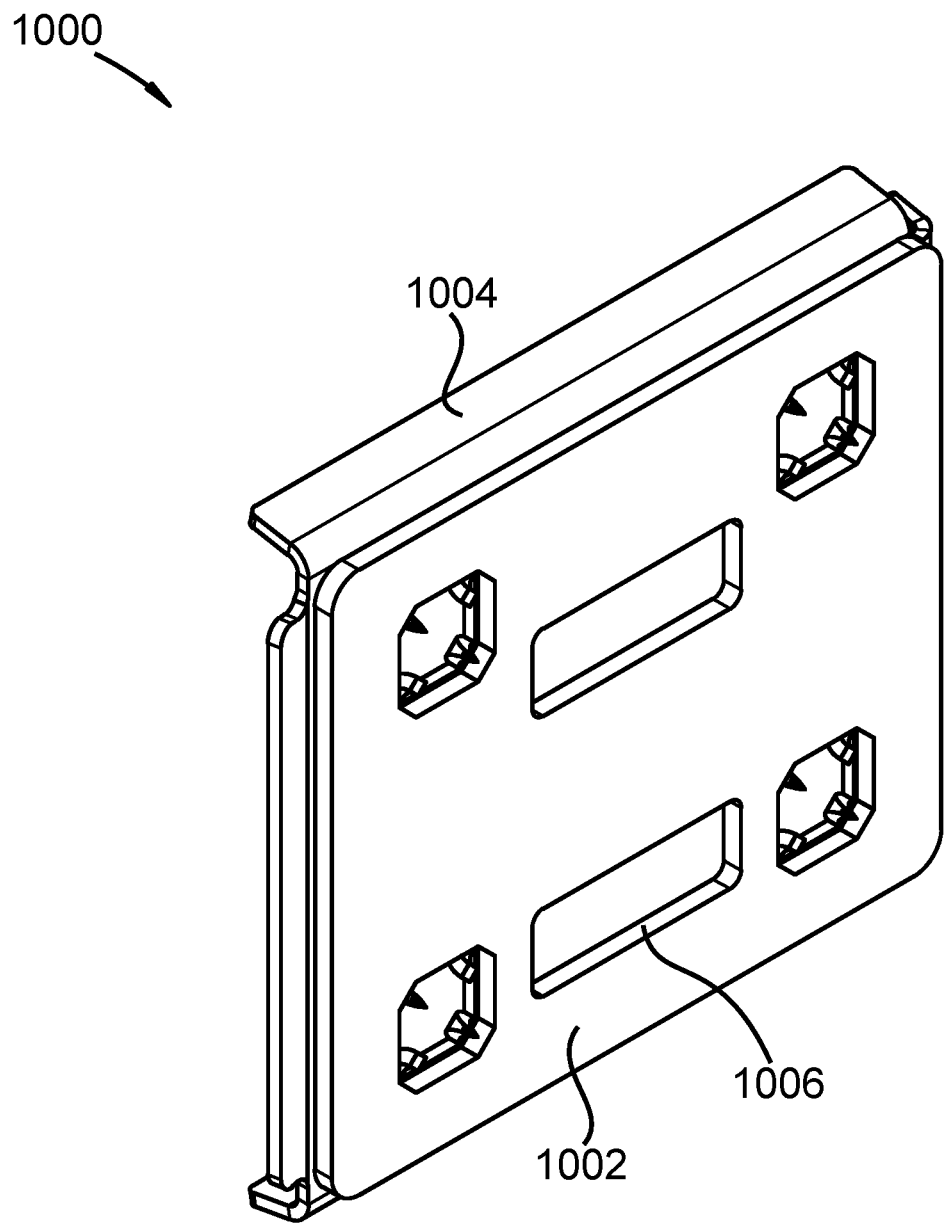
FIG. 10 is a perspective view showing a mounting bracket with an adhesive strip in accordance with an embodiment of the invention.

As shown in FIG. 9, a first end cap assembly 900 which corresponds to a different view of the first end cap assembly of FIG. 7. Return springs 902 and 904 are shown connected to the piston 706 and to outer member 708. The function of the return springs is to retract the piston member when the lever arm is rotated in an uninstalled position. Allowing the slide locks 644 and 646 to disengage from mounting bracket 642. One or more springs 902 and 904 may be used to retract the piston depending on the size or scale of the headrail.

In FIG. 10, the spikes, barbs, or cleats are provided in a circular configuration on the mounting bracket 1004, although other patterns are also possible. The illustrated configuration allows the mounting bracket 1004 and associated spikes, barbs, or cleats to be fabricated from stamped sheet metal, although other materials and fabrication techniques may also be used. The mounting bracket 1004 may be coated with an adhesive 1002 to adhere the mounting bracket 1004 to a window casing 102. The adhesive 1002 may substantially cover an entire planar surface of mounting bracket 1004.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for installing a window covering comprising:
    a first end cap assembly attached to a first end of a headrail of the window covering comprising:
        a first piston that extends upon rotation of a cam member;
        at least one return spring;

a second end cap assembly attached to a second end of the headrail of the window covering comprising:
a second piston with compression members; and
one or more spacers which go between the first end cap assembly and the headrail or the second end cap assembly and the headrail;
wherein, upon rotation of the cam member, the first piston of the first end cap assembly extends, and compresses the second piston of the second end cap assembly to create a compression fit between the headrail and two sides of a window casing;
wherein the at least one return spring retracts the first piston when the cam member is rotated to a disengaged position; and
wherein a portion of the first end cap assembly slides into and out of a first mounting bracket and a portion of the second end cap assembly slides into and out of a second mounting bracket.

2. The apparatus of claim 1, wherein the first end cap assembly is held to the first mounting bracket by one or more magnets and the second end cap assembly is held to the second mounting bracket by one or more magnets.

3. The apparatus of claim 1, wherein the first end cap assembly locks into the first mounting bracket and the second end cap assembly locks into the second mounting bracket when the first piston and the second piston are pressed between the window casing.

4. The apparatus of claim 1, wherein the cam member is connected to a lever arm.

5. The apparatus of claim 4, wherein the lever arm comprises a face portion connected to an arm portion forming a 90 angle therebetween.

6. The apparatus of claim 1, wherein the first mounting bracket and the second mounting bracket comprise one or more of spikes, barbs, or cleats.

7. The apparatus of claim 6, wherein the first mounting bracket and the second mounting bracket each comprise at least two spikes, barbs, or cleats, positioned at different angles relative to each other.

8. The apparatus of claim 1, wherein the first mounting bracket and the second mounting bracket remain in place on the window casing after removal of the window covering.

9. The apparatus of claim 1, wherein the rotational cam further comprises circular bearings on each side of a middle cam section.

10. The apparatus of claim 9, further comprising a groove on the first piston for receiving a bump on the middle cam section when the first piston is in a fully extended position.

11. The apparatus of claim 1, wherein the one or more compressible members are selected from one or more of springs, foam, compliant springs, pistons, or compressible material.

12. The apparatus of claim 1, wherein the first mounting bracket and the second mounting bracket are made of ferrous material.

13. The apparatus of claim 1, wherein the first mounting bracket and the second mounting bracket further comprise an adhesive strip.

14. The apparatus of claim 4, wherein the lever arm is rotated substantially 90 degrees to install the headrail in the window casing.

15. The apparatus of claim 1, wherein the cam member presses at least one of spikes, barbs, and cleats, incorporated into the mounting bracket into the window casing when rotated.

16. The apparatus of claim 1, further comprising: a mark or indicia on the first end cap assembly indicating, when visible, that the headrail is properly installed; or a mark or indicia on the second end cap assembly indicating, when invisible, that the headrail is not properly installed and that the one or more spacers need to be installed.

* * * * *